(12) United States Patent
Maziel et al.

(10) Patent No.: US 12,140,790 B2
(45) Date of Patent: Nov. 12, 2024

(54) ENCAPSULATED LIGHT-GUIDE OPTICAL ELEMENT

(71) Applicant: Lumus Ltd., Ness Ziona (IL)

(72) Inventors: Amit Maziel, Rehovot (IL); Yuval Ofir, Kfar HaOranim (IL)

(73) Assignee: LUMUS LTD., Ness Ziona (IL)

( * ) Notice: Subject to any disclaimer, the term of this patent is extended or adjusted under 35 U.S.C. 154(b) by 440 days.

(21) Appl. No.: 17/627,723

(22) PCT Filed: Jul. 19, 2020

(86) PCT No.: PCT/IL2020/050805
§ 371 (c)(1),
(2) Date: Jan. 17, 2022

(87) PCT Pub. No.: WO2021/009766
PCT Pub. Date: Jan. 21, 2021

(65) Prior Publication Data
US 2022/0357496 A1 Nov. 10, 2022

Related U.S. Application Data

(60) Provisional application No. 62/875,533, filed on Jul. 18, 2019.

(51) Int. Cl.
*F21V 8/00* (2006.01)
(52) U.S. Cl.
CPC ......... *G02B 6/0028* (2013.01); *G02B 6/0065* (2013.01)
(58) Field of Classification Search
CPC ..................... G02B 6/0028; G02B 6/0065
See application file for complete search history.

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 107238928 | 10/2017 |

(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

(Continued)

*Primary Examiner* — Joseph L Williams
(74) *Attorney, Agent, or Firm* — Rivka Friedman

(57) ABSTRACT

A light-guide optical element (LOE) and methods of manufacture are disclosed. The LOE includes a transparent substrate having a first refractive index, the substrate having a pair of parallel external surfaces along a length thereof, and a plurality of mutually parallel at least partially reflective internal surfaces, the mutually parallel internal surfaces being angled obliquely relative to the pair of external surfaces; and a transparent polymer resin encapsulating at least a part of the substrate to form an encapsulated structure, the polymer resin having a second refractive index that is matched to the first refractive index; wherein the encapsulated structure comprises a pair of parallel external surfaces of optical quality formed from the resin.

20 Claims, 9 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Maechler |
| 5,712,694 A | 1/1998 | Taira et al. |
| 5,724,163 A | 3/1998 | Yair |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,884,985 B2 | 2/2011 | Amitai et al. |
| 7,949,214 B2 | 5/2011 | Dejong |
| 7,995,275 B2 | 8/2011 | Maeda et al. |
| 8,000,020 B2 | 8/2011 | Amitai |
| 8,004,765 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker |
| 8,405,573 B2 | 3/2013 | Lapidot et al. |
| 8,432,614 B2 | 4/2013 | Amitai |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,810,914 B2 | 8/2014 | Amitai et al. |
| 8,861,081 B2 | 10/2014 | Amitai et al. |
| 8,873,148 B1 | 10/2014 | Gupta et al. |
| 8,902,503 B2 | 12/2014 | Amitai et al. |
| 8,913,865 B1 | 12/2014 | Bennett |
| 8,965,152 B2 | 2/2015 | Simmonds |
| 9,025,253 B2 | 5/2015 | Hadad et al. |
| 9,069,180 B2 | 6/2015 | Amitai et al. |
| 9,104,036 B2 | 8/2015 | Amitai et al. |
| 9,207,457 B2 | 12/2015 | Amitai |
| 9,248,616 B2 | 2/2016 | Amitai |
| 9,279,986 B2 | 3/2016 | Amitai |
| 9,316,832 B2 | 4/2016 | Amitai et al. |
| 9,417,453 B2 | 8/2016 | Amitai et al. |
| 9,448,408 B2 | 9/2016 | Amitai et al. |
| 9,500,869 B2 | 11/2016 | Amitai |
| 9,551,880 B2 | 1/2017 | Amitai |
| 9,568,738 B2 | 2/2017 | Mansharof et al. |
| 9,740,013 B2 | 8/2017 | Amitai et al. |
| 9,804,396 B2 | 10/2017 | Amitai |
| 9,805,633 B2 | 10/2017 | Zheng |
| 9,910,283 B2 | 3/2018 | Amitai |
| 9,933,684 B2 | 4/2018 | Brown et al. |
| 10,048,499 B2 | 8/2018 | Amitai |
| 10,261,321 B2 | 4/2019 | Amitai |
| 10,302,835 B2 | 5/2019 | Danziger |
| 10,739,598 B2 | 8/2020 | Ofir |
| 2001/0030860 A1 | 10/2001 | Kimura et al. |
| 2002/0015233 A1 | 2/2002 | Park |
| 2002/0036751 A1 | 3/2002 | Tanijiri et al. |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |

(56) References Cited

U.S. PATENT DOCUMENTS

| | | |
|---|---|---|
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0268421 A1 | 11/2006 | Shimizu et al. |
| 2007/0070859 A1 | 3/2007 | Hirayama |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0278812 A1 | 11/2008 | Amitai |
| 2009/0010023 A1 | 1/2009 | Kanade et al. |
| 2009/0052046 A1 | 2/2009 | Amitai |
| 2009/0122414 A1 | 5/2009 | Amitai |
| 2009/0190222 A1 | 7/2009 | Simmonds et al. |
| 2010/0067110 A1 | 3/2010 | Amitai et al. |
| 2010/0111472 A1 | 5/2010 | DeJong |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0096566 A1 | 4/2011 | Tsai et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0194781 A1 | 8/2012 | Agurok |
| 2012/0306940 A1 | 12/2012 | Machida |
| 2013/0022316 A1 | 1/2013 | Pelletier et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182748 A1 | 7/2015 | Gefen et al. |
| 2015/0219834 A1 | 8/2015 | Nichol et al. |
| 2015/0241619 A1 | 8/2015 | Richards et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0238844 A1 | 8/2016 | Dobschal |
| 2016/0341964 A1 | 11/2016 | Amitai |
| 2016/0370693 A1 | 12/2016 | Watanabe |
| 2017/0045743 A1 | 2/2017 | Dobschal et al. |
| 2017/0045744 A1 | 2/2017 | Amitai |
| 2017/0075119 A1 | 3/2017 | Schultz et al. |
| 2017/0097506 A1 | 4/2017 | Schowengerdt et al. |
| 2017/0242249 A1 | 8/2017 | Wall |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir |
| 2018/0039082 A1 | 2/2018 | Amitai |
| 2018/0157057 A1 | 6/2018 | Gelberg et al. |
| 2018/0292599 A1 | 10/2018 | Ofir et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |

FOREIGN PATENT DOCUMENTS

| | | |
|---|---|---|
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | H1994242260 | 3/1996 |
| JP | 2001021448 | 1/2001 |
| JP | 2002539498 | 11/2002 |
| JP | 2003140081 | 5/2003 |
| JP | 2003337298 A | 11/2003 |
| JP | 2003536102 | 12/2003 |
| JP | 2004527801 | 9/2004 |
| JP | 2005084522 | 3/2005 |
| JP | 2006003872 | 1/2006 |
| JP | 2007505353 A | 3/2007 |
| JP | 2009515225 | 4/2009 |
| JP | 2010060770 | 3/2010 |
| JP | 2010170606 | 8/2010 |
| JP | 2010217906 A | 9/2010 |
| JP | 2012123936 A | 6/2012 |
| JP | 2013076847 | 4/2013 |
| JP | 2014506340 A | 3/2014 |
| JP | 2016028275 A | 2/2016 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098087 | 9/2006 |

(56) References Cited

FOREIGN PATENT DOCUMENTS

| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 12088478 A1 | 6/2012 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

OTHER PUBLICATIONS

S. Chattopadhyay et al: "Anti-reflecting and photonic nanostructures", Materials Science and Engineering: R: Repots, vol. 69, No. 1-3, Jun. 20, 2010, pp. 1-35.

Petros I Stavroulakis et al: "Suppression of backscattered diffraction from sub-wavelenght "moth-eye" arrays References and Links / Optics Express 1", Endeavour Nanotechnology Zoolog. Sci. Philos. Trans. J. Mod. Opt. Appl. Opt. Opt. Acta (Lond.) Appl. Opt. Appl. Opt. Opt. Lett. Jpn. J. Appl. Pjys. J. Ceram. Soc. Jpn. Opt. Commun. App ;. Opt. Opt. Lett. Nanotechno, Jan. 1, 1967, pp. 79-84.

Chin-Hao Chang et al: "Nanostrutured gradient-index antireflection diffractive optics", Optics Letters, vol. 36, No. 12, Jun. 15, 2011, p. 2354.

Qiaoyin Yang et al: "Antireflection effects at nanostructured material interfaces and the suppression of thin-film interference", Nanotechnology, vol. 24, No. 23, May 15, 2013, p. 235202.

Hemant Kumar Raut et al: "Anti-reflective coatings: A critical, in-depth review", Energy & Environmental Science, vol. 4, No. 10, Jan. 1, 2011, p. 3779.

R. J. Weiblen et al: "Optimized moth-eye anti-reflective structures for $As_2S_3$ chalcogentide optical fibers", Optics Express, vol. 24, No. 10, May 2, 2016 p. 10172.

ENCAPSULATED LIGHT-GUIDE OPTICAL ELEMENT

TECHNICAL FIELD

The presently disclosed subject matter relates to a light-guide optical element and, more particularly, to a light-guide optical element for a near-eye display system.

BACKGROUND

Light-guide optical elements (LOE) are sometimes used for augmented reality applications, and may be comprised within a near-eye display system such as a head mounted device. Certain types of LOEs are made of a transparent substrate having a pair of parallel external surfaces, and a non-parallel set of mutually parallel partially reflective internal surfaces ("facets"). In some cases these LOEs further include, on an outer surface, a wedge-shaped prism through which an image is coupled in via a projector. The image propagates through the LOE via Total Internal Reflection (TIR) between the pair of parallel external surfaces and is coupled out towards the pupil of a viewer via the set of facets.

General Description

According to one aspect of the presently disclosed subject matter there is provided a method of manufacturing a light-guide optical element (LOE) including the steps of: forming an optical combiner element comprised of a transparent substrate having a first refractive index, the combiner element having a pair of parallel external surfaces along a length thereof, and a plurality of mutually parallel at least partially reflective internal surfaces, the mutually parallel internal surfaces being angled obliquely relative to the pair of external surfaces; and encapsulating, using a molding process, at least a part of the combiner element with a transparent polymer resin to form an encapsulated structure, the resin having a second refractive index that is matched to the first refractive index; wherein the encapsulated structure includes a pair of parallel external surfaces of optical quality formed from the resin.

In some embodiments, the molding process includes: providing a hollow mold having an internal cavity; fixing the combiner element to the mold such that the combiner element extends at least partially into the cavity; and filling the cavity with the resin and curing the resin, whereupon the combiner element is at least partially encapsulated by the resin.

In some embodiments, the method includes polishing the pair of parallel external surfaces of the resin.

In some embodiments, the method includes forming an angled surface at one longitudinal end of the LOE.

In some embodiments the method includes bonding a wedge prism to the angled surface.

In some embodiments the mold includes at least an upper portion and a lower portion, and the molding process further comprises, prior to filling the cavity with resin, aligning the upper portion and lower portion relative to one another to obtain parallelism between the pair of external surfaces of the encapsulated structure.

In some embodiments, the cavity includes a main cavity and a secondary cavity at a longitudinal end of the main cavity, the secondary cavity having a wedge shape such that upon removing the combiner element from the mold, the encapsulating resin includes a wedge-shaped portion at a longitudinal end thereof.

In some embodiments, the molding process is performed in two stages, in which a first stage comprises filling the secondary cavity with a first part of the resin, and the second stage comprises, after curing of the first part of the resin, filling the main cavity with a second part of the resin.

In some embodiments, the molding process includes polishing active areas of the mold prior to filling with resin, such that the parallel external surfaces of the encapsulated structure satisfy one or more desired structural parameters of the LOE.

In some embodiments, the one or more structural parameters include at least one of roughness less than or equal to 25 nm peak value (Ra), and flatness equal to or less than 6 fringe power with 2 power irregularity over a circle of 20 mm diameter.

In some embodiments, the upper and lower portions are aligned using an active alignment process such that that after molding, the encapsulated structure includes parallel external surfaces.

According to another aspect of the presently disclosed subject matter there is provided a light-guide optical element (LOE) including a transparent substrate having a first refractive index, the substrate having a pair of parallel external surfaces along a length thereof, and a plurality of mutually parallel at least partially reflective internal surfaces, the mutually parallel internal surfaces being angled obliquely relative to the pair of external surfaces; and a transparent polymer resin encapsulating at least a part of the substrate to form an encapsulated structure, the polymer resin having a second refractive index that is matched to the first refractive index; wherein the encapsulated structure comprises a pair of parallel external surfaces of optical quality formed from the resin.

In some embodiments, the external surfaces of the encapsulating the pair of external surfaces of the encapsulating resin are parallel to a tolerance of up to 1.5 arcminutes.

In some embodiments, the LOE includes an angled surface at one longitudinal end thereof.

In some embodiments, the LOE includes a wedge prism bonded to the angled surface.

In some embodiments, the encapsulating resin includes a wedge-shaped portion at one longitudinal end thereof.

In some embodiments, the substrate is at least partly encapsulated by the resin using a molding process.

In some embodiments, the molding process includes active alignment of one or more mold parts to achieve desired parallelism between the external surfaces of the encapsulated structure.

In some embodiments, the molding process includes machining of one or more mold parts to satisfy desired structural parameters of the LOE during the molding process.

In some embodiments, the one or more structural parameters include at least one of roughness less than or equal to 25 nm peak value (Ra), and flatness equal to or less than 6 fringe power with 2 power irregularity over a circle of 20 mm diameter.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

It should be appreciated that the drawings are not drawn to scale, and in some cases may be exaggerated to emphasize certain details that may otherwise not be apparent.

Figure 1A:
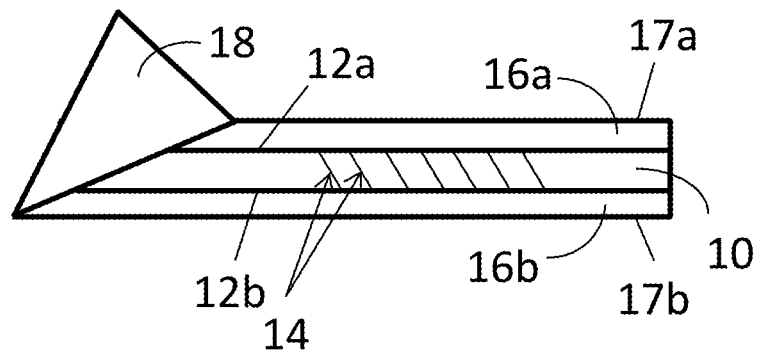
FIG. 1A illustrates a side view of a LOE according to the prior art.
Figure 1B:
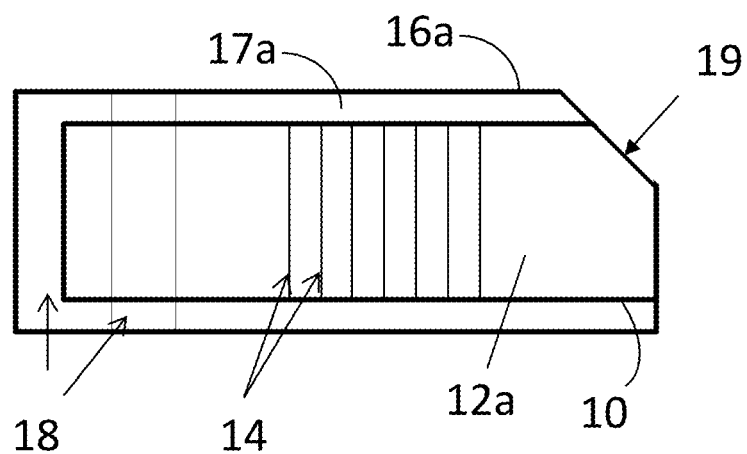
FIG. 1B illustrate a top-down view of a LOE according to the prior art.

FIGS. 1A-1B illustrate a side view and top-down view, respectively, of a LOE according to the prior art. The LOE includes an optical combiner element 10 made of a transparent substrate having a pair of parallel external surfaces 12a, 12b along a length hereof, and a plurality of mutually parallel at least partially reflective internal surfaces 14, the mutually parallel internal surfaces being angled obliquely relative to the pair of external surfaces. The LOE further includes a pair of transparent optical plates 16a, 16b bonded to the parallel surfaces 12a, 12b of the combiner element. The plates typically have a refractive index optically matched to the refractive index of the substrate, in order to facilitate total internal reflection between external surfaces of the plates of light rays propagating along the length of the combiner element. The external surfaces 17a, 17b of optical plates 16a, 16b are also parallel to each other and to the surfaces 12a, 12b of the combiner element. Typically, after bonding the glass plates, the plates are polished using a double side polishing process to achieve accurate parallelism. In some cases, the LOE includes a wedge prism 18 bonded to one longitudinal end thereof. In some cases, the LOE further includes a corner 19 at the longitudinal end opposite the wedge prism 18.

Amongst problems of the prior art methods of fabricating the LOE is the arduous process of bonding the glass plates to the combiner element, which must be performed delicately and accurately. As a result, the bonding process is long and expensive.

An additional difficulty exists in the process of bonding the wedge prism, which also must be performed very accurately, and as a result makes mass production difficult and expensive.

In contrast to the prior art LOE described above, the LOE disclosed herein solves the problem posed by bonding glass plates, by encapsulating the combiner element in optical resin which is used in place of glass plates.

Additionally, according to some embodiments disclosed herein, the wedge prism is integrally formed with the encapsulating resin, thereby solving the second difficulty described above, and enhancing the mass production capabilities of the LOE.

Figure 2A:
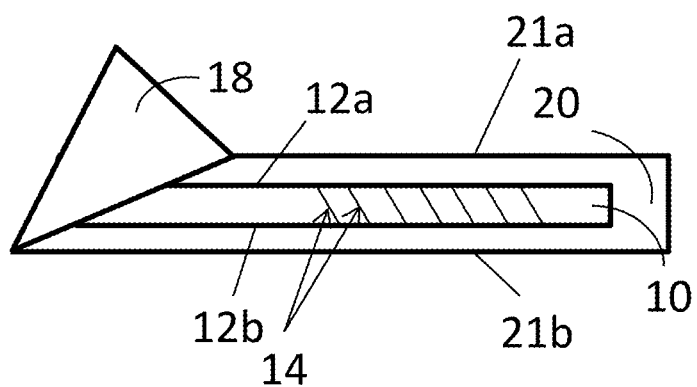
FIG. 2A illustrates schematically a side view of a LOE according to a first embodiment of the disclosed subject matter.
Figure 2B:
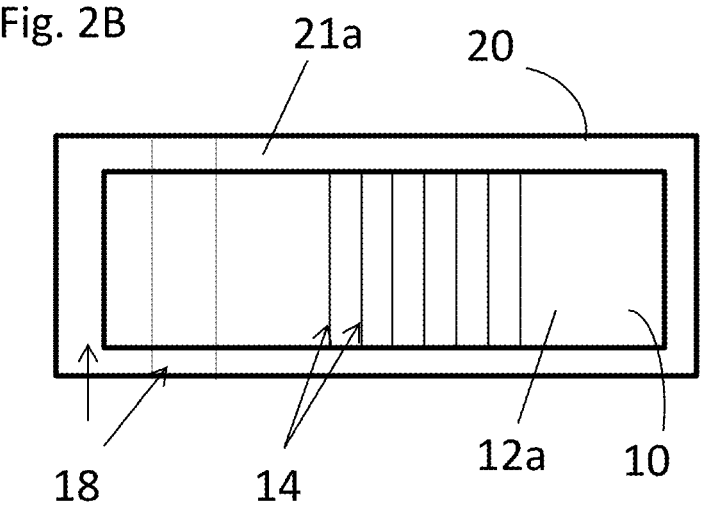
FIG. 2B illustrates schematically a top-down view of a LOE according to a first embodiment of the disclosed subject matter.

FIGS. 2A-2B illustrate, respectively, a side view and top-down view of a LOE according to a first embodiment of the disclosed subject matter. The LOE includes an optical combiner element 10 made of a transparent substrate having a pair of parallel external surfaces 12a, 12b along a length hereof, and a plurality of mutually parallel at least partially reflective internal surfaces 14, the mutually parallel internal surfaces 14 being angled obliquely relative to the pair of external surfaces 12a, 12b. The combiner element 10 is at least partially encapsulated by a transparent polymer resin 20 having a refractive index (RI) that is optically matched to the RI of the substrate. The overall encapsulated structure includes a pair of parallel external surfaces of optical quality formed from the resin, the pair of parallel external surfaces of the encapsulated structure being parallel to the surfaces 12a, 12b of the combiner element. "Parallel external surfaces" refers herein in the description and claims to external surfaces which are parallel, preferably to within a tolerance of 1.5 arcminutes angular offset or less.

As used above and throughout this description, "transparent", should be understood to include less than complete transparency. Practically speaking, the substrate and resin need only be sufficiently transparent to propagate an injected image (e.g. via a projector) whilst facilitating transmission of light from the outside world. Additionally the term "matched" should be understood to mean that the RI of the substrate and the RI of the resin are within $+/-1E^{-4}$ of each other, or at least within 0.002% of each other, and are preferably sufficiently close that the interface does not generate a clearly visible optical discontinuity. An "optical quality" external surface should be understood to mean sufficiently smooth that it does not give rise to significant scattering of light, and is therefore suitable as a surface through which a viewer can observe a projected image and/or the real world.

In some embodiments, as shown in FIGS. 2A-2B, the LOE can include a wedge prism 18 at one longitudinal end, bonded to an angled polished surface of the encapsulated LOE.

Figure 3:
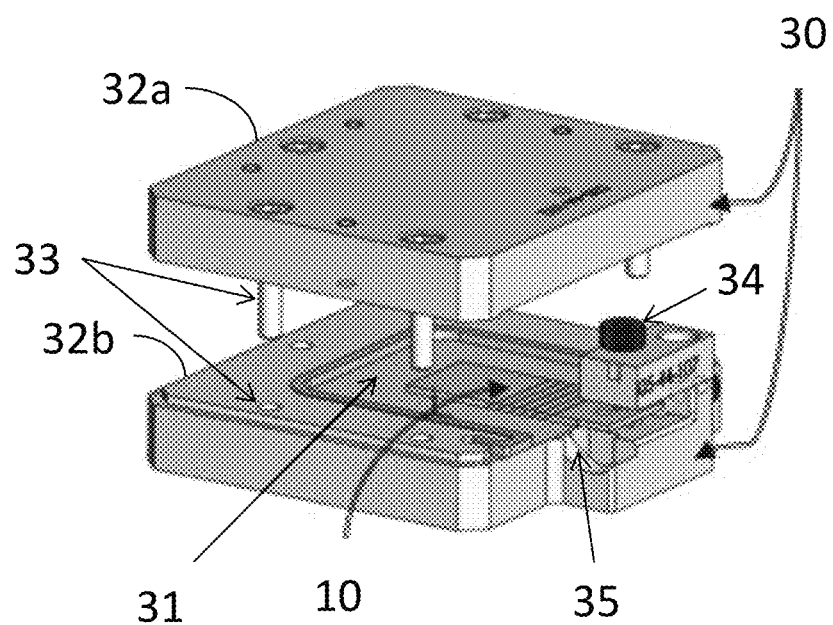
FIG. 3 illustrates schematically an exemplary mold 30 in accordance with certain aspects of the disclosed subject matter.

Preferably, encapsulation of the combiner element is performed using a molding process. FIG. 3 illustrates schematically an exemplary mold 30 that may be used for the molding process, further details of which will now be provided. Mold 30 is preferably a hollow mold having an internal cavity 31. Mold 30 preferably consists of at least two parts 32a, 32b that are attachable to one another, with each part having a respective internal indentation that when attached, align to form the mold's internal cavity. The mold further includes of a first attachment mechanism 33 that facilitates attachment of the respective parts 32a, 32b to each other. The mold further includes of a second attachment mechanism 34 that facilitates fixing the combiner element to the mold such that the combiner element extends at least partially into cavity 31, as shown in FIG. 3, while keeping a space between surfaces 12a, 12b and the cavity walls of preferably 0.25-0.35 mm. The mold further includes an opening or hole 35 leading to cavity 31 that allows the cavity to be filled with a liquid or semi-liquid form polymer resin when parts 32a, 32b are attached to one another and the combiner element 10 is fixed in place. In some embodiments, the resin is inserted into the mold while the mold is positioned vertically with hole 35 on top such that the resin fills all the entire cavity.

Thus, an exemplary molding process for the encapsulation of the combiner element includes, using the exemplary mold described above, i) fixing the combiner element to the mold such that the combiner element extends at least partially into the cavity, ii) filling the cavity with the polymer resin, iii) curing the resin, and iv) removing the encapsulated structure from the mold.

Figure 4:
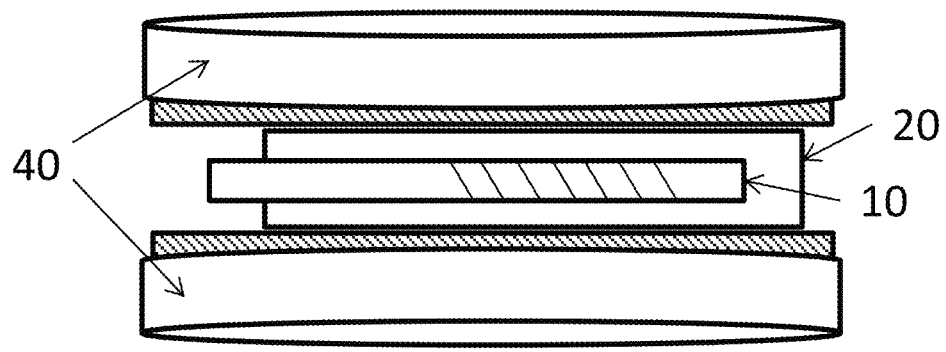
FIG. 4 illustrates schematically a double side polishing process on the encapsulated LOE in accordance with certain aspects of the disclosed subject matter.
Figure 5:
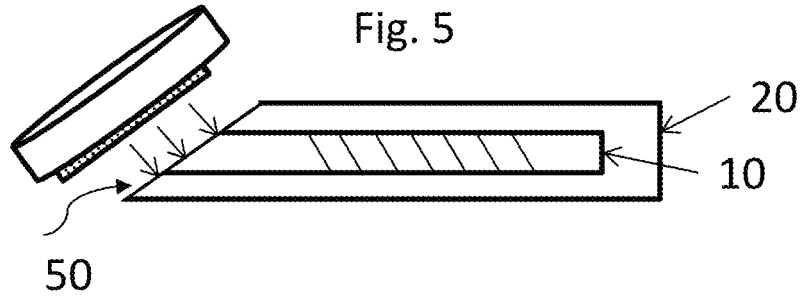
FIG. 5 illustrates schematically forming an angled surface at one longitudinal end of the LOE in accordance with certain aspects of the disclosed subject matter.
Figure 6:
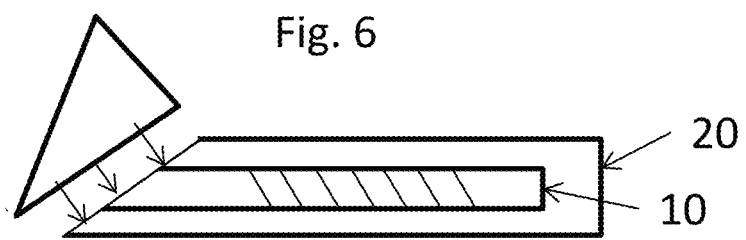
FIG. 6 illustrates schematically bonding a wedge prism on the angled surface of the LOE in accordance with certain aspects of the disclosed subject matter.

In some embodiments, further processing may be performed on the encapsulated LOE as needed according to the require design specifications of the LOE. For example, in some embodiments, further processing may include one or more of:

1. Polishing the major parallel external surfaces 21a, 21b of the encapsulated LOE to achieve accurate parallelism between the external surfaces, for example using a double-side polisher 40, as shown in FIG. 4, or other suitable techniques known to persons skilled in the art;
2. Forming an angled surface 50 at one longitudinal end of the LOE, for example by angle grinding followed by polishing, as shown in FIG. 5;
3. Bonding a wedge prism to the angled surface using an optical adhesive, as shown in FIG. 6. In some cases, a reflective coating can be applied to the interface between the angled surface and the wedge prism prior to bonding; and
4. Shaping the final contours of the encapsulated LOE.

Figure 7A:
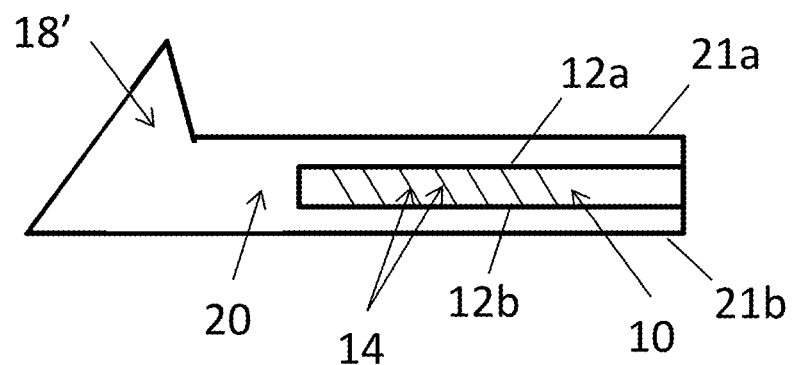
FIG. 7A illustrates schematically a side view of a LOE according to a second embodiment of the disclosed subject matter.
Figure 7B:
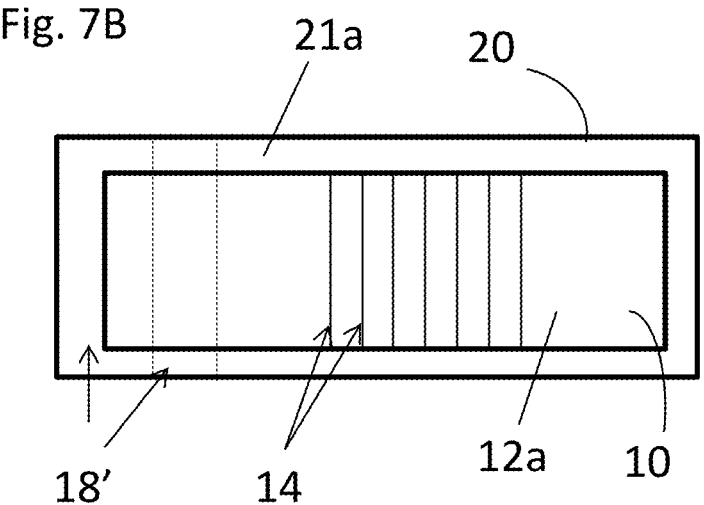
FIG. 7B illustrates schematically a top-down view of a LOE according to a second embodiment of the disclosed subject matter.

FIGS. 7A-7B illustrate a side view and top-view, respectively, of a LOE according to a second embodiment of the disclosed subject matter. This embodiment differs from the first embodiment in that the LOE includes a wedge-shaped portion 18' at one longitudinal end that is integrally formed with the encapsulating resin and made from the polymer resin during the molding process.

According to this embodiment, the molding process is varied somewhat so as to include molding the wedge-shaped portion. Additionally, since double side polishing will be made more difficult with the existence of the wedge-shaped portion 18', some embodiments include accurately aligning mold parts prior to filling with resin so that no additional processing is necessary to achieve the desired structural parameters of the finished LOE during the molding process.

According to this embodiment, the cavity of the mold includes a main cavity and a secondary cavity within the main cavity at one longitudinal end of the main cavity. The main cavity is sized and shaped based in accordance with the desired shape of the encapsulated LOE, excluding the wedge-shaped portion, while the secondary cavity is shaped to form a wedge. In some embodiments, the mold can have a plurality of different shaped components that fit together to form the main cavity and secondary cavity.

Figure 8A:
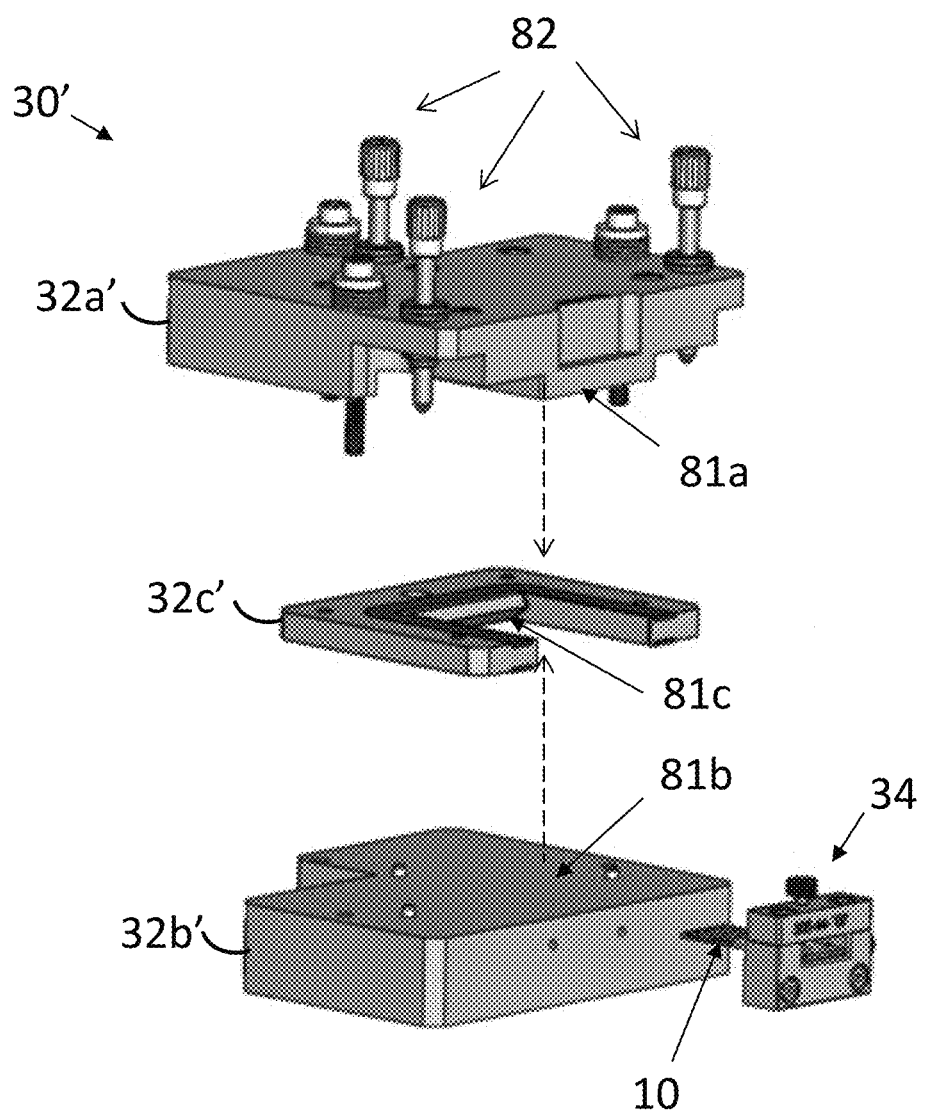
FIG. 8A illustrates schematically an exploded view of an exemplary mold according to embodiments of the disclosed subject matter.

FIG. 8A illustrates an exemplary mold according to this embodiment. Mold 30' includes an upper portion 32a' having an active area 81a that shapes at least the top surface of the final LOE, a lower portion 32b' having an active area 81b that shapes at least the bottom surface of the LOE. In a particularly preferred embodiment, mold 30' further includes a middle portion 32c' sandwiched between the upper and lower portions with an active area 81c that shapes at least part of the wedge-shaped portion of the LOE. In other embodiments, the wedge-shaped portion can be formed from one of the upper or lower portions 32a', 32b', or a combination of both. In this context, "active area" refers to an interior surface of mold 30' (i.e. cavity wall) that contacts the resin.

Figure 8B:
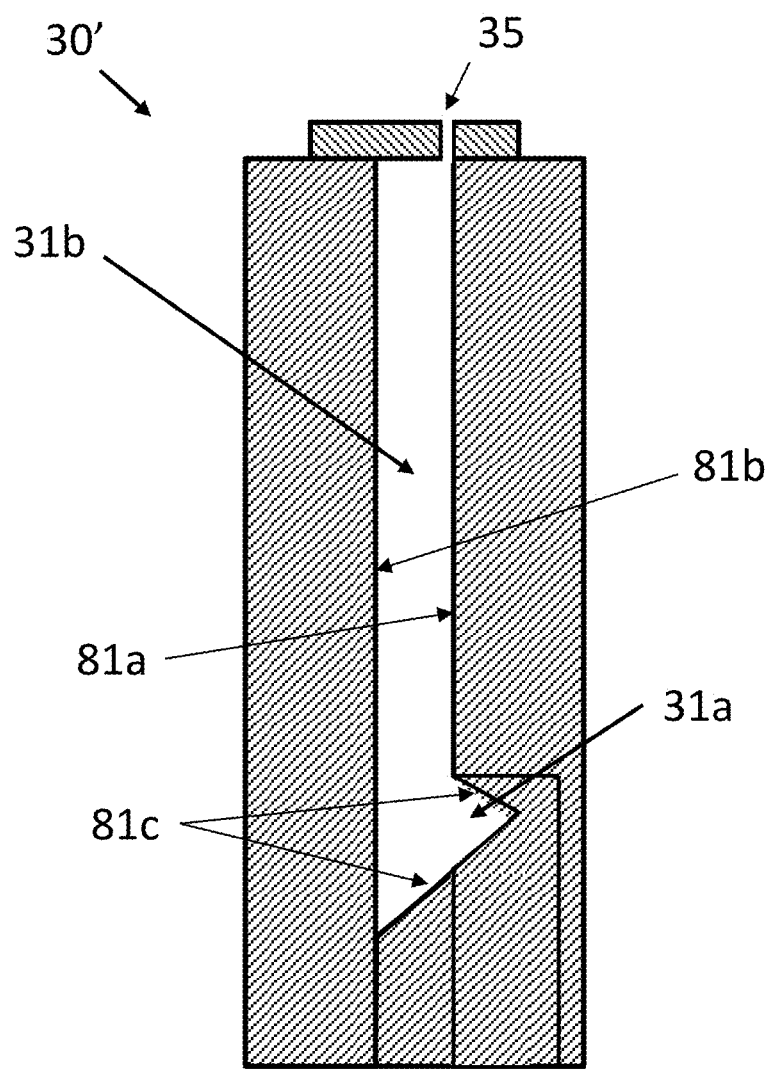
FIG. 8B illustrates a cross-sectional view of an exemplary mold oriented vertically according to embodiments of the disclosed subject matter.

FIG. 8B illustrates exemplary mold 30' oriented vertically, with the hole 35 on top such that the inserted resin first fills secondary cavity 31a and then fills the main cavity 31b. It should be noted that FIG. 8B omits the combiner element in order to draw the viewer's attention to the shape and location of the main cavity and secondary cavity, but that in practice the combiner element would be fixed to the mold so as to extend at least partially into the main cavity.

According to this embodiment, mold 30' may be manufactured and processed such that after molding, the encapsulated LOE will satisfy specific predetermined design characteristics such that no further processing may be necessary, other than perhaps shaping the final contours.

In a particularly preferred embodiment, the active areas of the mold are machined prior to filling with resin in order to satisfy, during the molding process, specific design requirements pertaining to one or more structural parameters of the finished LOE. Typical structural parameters include, e g minimum tolerable values pertaining to flatness, roughness and parallelism of the external optical surfaces. For example, typical design requirements for the external surfaces of an LOE may include roughness equal to or less than twenty five (25) nm peak-value on average (25 nm Ra), and flatness equal to or less than six (6) fringe power, two (2) power irregularity over a circle of 20 mm diameter. These requirements can be achieved in the molding process by polishing the active areas of the mold (and particularly the active areas that shape the external parallel surfaces), e.g. using a diamond turning polisher, to achieve a roughness and flatness meeting or exceeding the parameters specified above. Parallelism can be achieved by alignment of mold active areas, as will be explained below.

Referring back to FIG. 8A, in a particularly preferred embodiment, the upper and lower portions of the mold are rotatable on three (3) axis rotatable relative to each other prior to fixing in place, for example using a series of tilt screws 82, such that the upper and lower mold portions can be accurately and actively aligned (e.g. using one or more autocollimators) prior to filling the cavity formed therein with resin.

Figure 9:
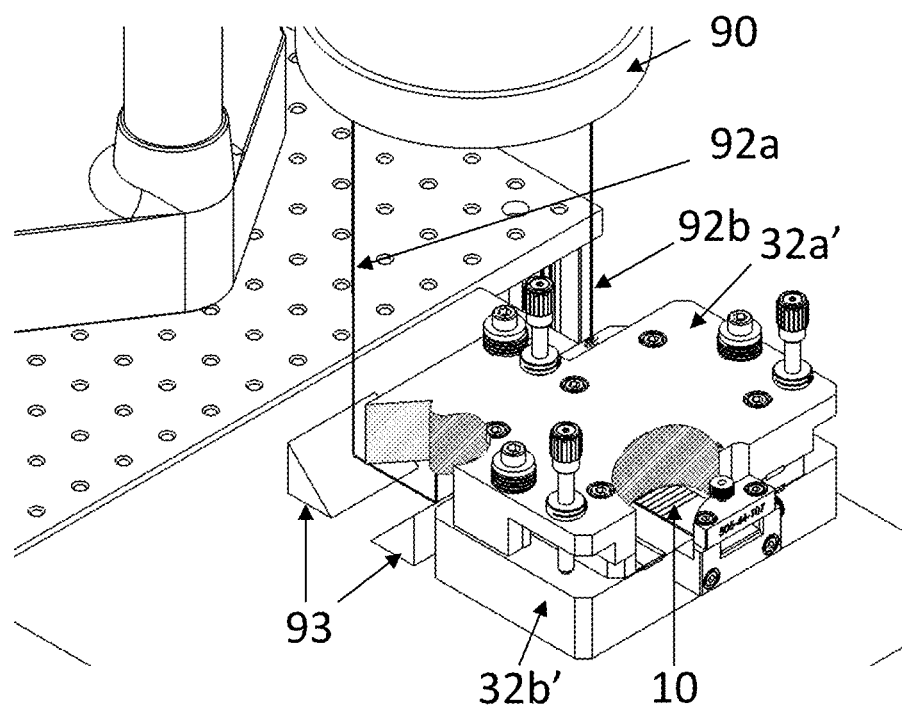
FIG. 9 illustrates schematically an alignment process according to embodiments of the disclosed subject matter.

Specific design requirements as to parallelism can be achieved during the molding process by accurately aligning the mold parts prior to filling with resin, most preferably using an active alignment process. FIG. 9 illustrates schematically an exemplary active alignment process. Autocollimator 90 emits parallel light beams 92a, 92b. Beam 92b is directed to hit the active area of the upper portion or a plane parallel thereto, while beam 92a is directed, using deployed reflective lenses 93, to hit the active area of the lower portion or a plane parallel thereto. The upper and lower portions are then rotated with respect to one another until each of beams 92a, 92b are accurately orthogonal to the respective active areas or planes parallel thereto. The upper and lower mold portions are then firmly fixed in place, thus guaranteeing parallelism between the active areas that shape the external surfaces of the overall encapsulated structure, such that after molding, the encapsulated structure includes parallel external surfaces 21a, 21b.

Additional design requirements for the finished LOE may dictate a maximum tolerable stress birefringence (e.g. 50 nm/cm). One challenge that can arise with a mold having a main cavity which is relatively narrow and a wider secondary cavity is that the resin in the secondary cavity can experience shrinkage during the curing process, causing non-homogenous flow of resin through a "passage" between the two cavities, and corresponding local internal stress in the finalized polymer-encapsulated LOE. Optically, those internal stresses can cause polarization retardancy known as birefringence. This undesirable effect can be reduced or even eliminated by inserting the resin into the mold in two stages. First, the resin is inserted into the secondary cavity and cured. After that, resin is inserted into the main cavity and cured.

It should be appreciated by those skilled in the art that using the molding process described above can produce a finished LOE that meets typical required design specifications without further processing, other than perhaps shaping out the final contours. Having therefore eliminated the step of bonding the wedge prism to the LOE, and reducing or eliminating the post-encapsulation processing steps, the LOE according to this embodiment may be mass produced quickly and efficiently, and at reduced cost.

It should further be appreciated by those skilled in the art that the principles disclosed herein are not limited to the specific combiner element described and shown in the drawings, but are applicable to any suitable combiner element, including, e.g. a two-dimensional expansion combiner element, with appropriate modification as needed.

The invention claimed is:

1. A method of manufacturing a light-guide optical element (LOE) comprising the steps of:
   forming an optical combiner element comprised of a transparent substrate having a first refractive index, the combiner element having a first pair of parallel external surfaces along a length thereof, and a plurality of mutually parallel at least partially reflective internal surfaces, the mutually parallel internal surfaces being angled obliquely relative to the first pair of external surfaces; and
   encapsulating, using a molding process, at least a part of the combiner element with a transparent polymer resin to form an encapsulated structure, the resin having a second refractive index that is matched to the first refractive index,
   wherein said encapsulated structure comprises a second pair of parallel external surfaces of optical quality formed from the resin.

2. The method of claim 1, wherein the molding process comprises:
   providing a hollow mold having an internal cavity;
   fixing the combiner element to the mold such that the combiner element extends at least partially into the cavity; and
   filling the cavity with the resin and curing the resin, whereupon the combiner element is at least partially encapsulated by the resin.

3. The method of claim 2, wherein the mold comprises at least an upper portion and a lower portion, and the molding process further comprises, prior to filling the cavity with resin, aligning the upper portion and lower portion relative to one another such that the encapsulated structure is formed with parallel external surfaces.

4. The method of claim 3, wherein the upper and lower portions are aligned using an active alignment process.

5. The method of claim 2, wherein the cavity includes a main cavity and a secondary cavity at a longitudinal end of the main cavity, the secondary cavity having a wedge shape such that upon removing the combiner element from the mold, the encapsulating resin includes a wedge-shaped portion at a longitudinal end thereof.

6. The method of claim 5, wherein the molding process is performed in two stages, in which a first stage comprises filling the secondary cavity with a first part of the resin, and the second stage comprises, after curing of the first part of the resin, filling the main cavity with a second part of the resin.

7. The method of claim 2, further comprising polishing active areas of the mold prior to filling with resin, such that the parallel external surfaces of the encapsulated structure satisfy one or more structural parameters of the LOE.

8. The method of claim 2, wherein the one or more structural parameters include at least one of: roughness less than or equal to 25 nm peak value (Ra), and flatness equal to or less than 6 fringe power with 2 power irregularity over a circle of 20 mm diameter.

9. The method of claim 1, further comprising polishing the second pair of parallel external surfaces.

10. The method of claim 1, further comprising forming an angled surface at one longitudinal end of the LOE.

11. The method of claim 10, further comprising bonding a wedge prism to the angled surface.

12. A light-guide optical element (LOE) comprising:
   an optical combiner element made of a transparent substrate having a first refractive index, the optical combiner element having a first pair of parallel external surfaces along a length thereof, and a plurality of mutually parallel at least partially reflective internal surfaces, the mutually parallel internal surfaces being angled obliquely relative to the first pair of external surfaces; and
   a transparent polymer encapsulating at least a part of the optical combiner element to form an encapsulated structure, the polymer having a second refractive index that is matched to the first refractive index,
   wherein said encapsulated structure comprises a second pair of parallel external surfaces of optical quality formed from the polymer.

13. The light-guide optical element of claim 12, wherein the second pair of external surfaces are parallel to a tolerance of up to 1.5 arcminutes.

14. The light-guide optical element of claim 12, further comprising an angled surface at one longitudinal end thereof.

15. The light-guide optical element of claim 14, further comprising a wedge prism bonded to the angled surface.

16. The light-guide optical element of claim 15, wherein the encapsulating structure includes a wedge-shaped portion at one longitudinal end thereof.

17. The light-guide optical element of claim 12, wherein the optical combiner element is at least partly encapsulated by the polymer using a process of resin molding.

18. The light-guide optical element of claim 17, wherein the resin molding process includes active alignment of one or more mold parts to obtain parallelism between the mold parts prior to forming the encapsulated structure.

19. The light-guide optical element of claim 17, wherein the resin molding process includes polishing one or more active areas of one or more mold parts prior to molding.

20. The light-guide optical element of claim 19, wherein the one or more active areas are polished to at least one of the following parameters: roughness less than or equal to 25 nm peak value (Ra), and flatness equal to or less than 6 fringe power with 2 power irregularity over a circle of 20 mm diameter.

* * * * *